United States Patent Office 3,574,725
Patented Apr. 13, 1971

3,574,725
METHOD FOR PREPARING L-(—)-α-METHYL-β-(3,4-DIHYDROXYPHENYL)-ALANINE
Toshinori Kurano, Kanagawa-ken, and Mitsukazu Fukuda and Masahide Horiuchi, Tokyo, Japan, assignors to Sankyo Chemical Industries Ltd.
No Drawing. Filed Mar. 27, 1967, Ser. No. 625,967
Claims priority, application Japan, Aug. 11, 1966, 41/52,736; Feb. 21, 1967, 42/11,016
Int. Cl. C07c *101/08*
U.S. Cl. 260—519         6 Claims

ABSTRACT OF THE DISCLOSURE

A process for obtaining substantially pure L-(—)-α-methyl-β-(3,4-dihydroxyphenyl)-alanine which comprises seeding a saturated solution of DL-N-acyl-α-methyl-β-(3,4-methylenedioxyphenyl)-alanine with L-N-acyl-α-methyl-β-(3,4-methylenedioxyphenyl)-alanine to initiate crystallization thereof from said solution, recovering the crystallized laevo compound and deacylating and dealkylating the recovered, crystallized compound by hydrolysis in the presence of a phenol.

This invention relates to a method for the preparation of L-(—)-α-methyl-β-(3,4-dihydroxyphenyl)-alanine (hereinafter referred to as "L-methyldopa").

In accordance with the method of the present invention, the L-methyldopa is prepared by acylating DL-α-methyl-β-(3,4-methylenedioxyphenyl)-alanine (hereinafter referred to as "DL-alanine") to produce DL-N-acyl-α-methyl-β-3,4-methylenedioxyphenyl)-alanine (hereinafter referred to as "DL-acyl-alanine"), optically resolving in a batchwise or continuous manner according to selective crystallization process the resulting DL-acyl-alanine, and then hydrolyzing the resulting L-optical isomer in the presence of a phenol to effect deacylation and dealkylation.

In the prior art, L-methyldopa has been made available according to any one of the following three processes:

(1) A process carried out by forming D- and L-salts from DL-N-acetyl-α-methyl-β-(3,4-dimethoxyphenyl)-alanine and 1-(—)-α-phenylethylamine, separating the L-salt from the D-salt by utilization of their difference in solubility for solvent, and then liberating said L-salt as L-N-acetyl-α-methyl-β-(3,4-dimethoxyphenyl)-alanine, followed by hydrolysis to obtain L-methyldopa. See "Journal of Organic Chemistry," 29, 2053 (1964).

(2) A process in which DL-α-methyl-β-(3,4-dihydroxyphenyl)-alanine is subjected directly to optical resolution to obtain L-methyldopa. (See United States Patent No. 3,158,648.)

(3) A process in which DL-α-acetamide-α-vanillylpropionitrile is subjected directly to optical resolution to obtain L-(—)-α-acetamide-α-vanillylpropionitrile, which is then hydrolyzed to form L-methyldopa. (See Japanese Patent Publication No. 7,698/1966.)

These conventional processes, however, suffer from various disadvantages in commercial production of L-methyldopa. That is, in process (1), the 1-(—)-α-phenylethylamine should be separately synthesized and is relatively expensive and, moreover, it is in the form of a liquid and hence is difficultly recovered. In process (2), D-methyldopa should necessarily be reused after reduction to DL-methyldopa through a complex step. Further, in process (3), the starting DL-α-acetamide-α-vanillylpropionitrile is required to be synthesized from relatively expensive vaniline. Moreover, said compound is low in supersaturation degree and therefore the amount of optical isomer crystallized per batch is disadvantageously small.

As the result of studies made in order to find a commercially advantageous process for the preparation of L-methyldopa, we have established the method of the present invention. In accordance with the present invention, there is provided a method wherein DL-alanine, which is obtainable with ease and at low cost, is subjected to acylation, thereby to produce DL-acyl-alanine, the resulting DL-acylalanine is subjected directly to optical resolution according to selective crystallization process, and then the resulting L-optical isomer is hydrolyzed to obtain L-methyldopa.

That is, the DL-acyl-alanine which is a novel compound unknown in the prior art is prepared in any manner known per se by acylation of the DL-alanine. Then, a supersaturated solution of DL-acyl-alanine is prepared and is seeded with an optical isomer of the one type (L- or D-form) as seed crystals, whereby an optically active substance identical in type with the seeded crystals is selectively crystallized. This mother liquor is again made into supersaturated solution by further addition of DL-acyl-alanine and is then seeded with an optical isomer of the other type (D- or L-form) to obtain another optically active substance identical therewith. When the above operation is repeated, optical isomers reverse to each other can be alternately obtained according to a so-called batchwise process and the DL-acyl-alanine is optically resolved to L-acyl-alanine and D-acyl-alanine. The thus obtained L-acyl-alanine is then hydrolyzed with hydrohalogenic acid in the presence of a phenol according to the ordinary procedure, whereby the desired L-methyldopa can be prepared in high yields.

It is quite unexpected that the novel DL-acyl-alanine is directly optically resolved according to selective crystallization process, in view of the fact that we were unsuccessful in the same direct optical resolution according to selective crystallization process of compounds similar to DL-acyl-alanine such as, for example, DL-N-acetyl-α-methyl-β-(3,4-dimethoxyphenyl)-alanine, DL-N-acetyl-α-methyl-β-(3-methoxy-4-hydroxyphenyl)-alanine, DL-N-acetyl-α-methyl-β-(3,4-diacetoxyphenyl)-alanine and DL-N-acetyl-β-(3,4-methylenedioxyphenyl)-alanine.

In practising the present method, the first step, i.e. the acylation step may be conducted by any of ordinary procedures well known to those skilled in the art. The term "acyl" as used herein means to include lower aliphatic acyl such as formyl, acetyl and the like. However, formyl and acetyl are preferable and the acetyl group is most preferable in view of its cost and its easiness in deacylation and treatment after hydrolysis.

In introduction of those acyl groups other than formyl into the DL-alanine, the acylation may be preferably conducted by reacting the DL-alanine with anhydride or halide, preferably chloride, of lower aliphatic carboxylic acid in the presence of a basic substance and a suitable inert organic solvent such as benzene, toluene, acetic acid and water. Representative examples of the basic substance to be employed in this step include organic basic substances such as pyridine, picoline and dimethylaniline and inorganic basic substances such as sodium and potassium hydroxides. Since the organic basic substance may act as both a solvent and an acid binding agent, such substances may be employed in an amount excess over that required as an acid binding agent, without additional employment of those solvents as set forth above. The reaction temperature in this step depends mainly upon the basic substance employed. Generally speaking, where organic basic substance is used, the preferred reaction temperature is from about 80° C. to 130° C. and, in case of inorganic basic substances, from about 0° C. to 50° C. The formylation in this step may be successfully conducted, for example, by employing such acylating agents as a mixture of formic acid and acetic anhydride.

After completion of the reaction, the desired product in this step, the DL-acyl-alanine may be recovered from the reaction mixture by any of ordinary procedures well known to those skilled in the art. For example, the solvent is removed by distillation under reduced pressure and the residue is treated with a dilute acid to remove excess basic substance, thereby to obtain the desired DL-acyl alanine.

The solvents to be used in practicing the second step, i.e. the resolution step may be any of those which can form supersaturated solutions of DL-acyl-alanine, and include such organic solvents as aliphatic alcohols, e.g. methanol, ethanol and isopropanol; lower alkyl ketones, e.g. acetone and methylethylketone; and aliphatic lower alkyl esters, e.g. ethyl acetate and isobutyl acetate, mixtures thereof. Aqueous solutions thereof also are usable. Preferable solvents are aliphatic alcohols, particularly methanol, 95% ethanol and isopropanol. For the supersaturation of DL-acyl-alanine, there may be adopted various procedures such as, for example, concentration, cooling, variation in composition of solvent employed to dissolve DL-acyl-alanine. However, a procedure preferable for the practice of the present method is such that a solution of DL-acyl-alanine is warmed or heated to form a saturated solution, which is then cooled to a supersaturated solution. For the preparation of the optical isomer from said supersaturated solution, there may be adopted the so-called batch process mentioned above. Alternatively, however, the optical isomer may be obtained according to a so-called continuous process carried out by passing the supersaturated solution through a fixed bed comprising the optical isomer thereby effecting the resolution and crytsallization continuously.

The amount of optical isomer crystallized varies depending on the supersaturation degree of the solution. The higher the supersaturation degree, the greater becomes the amount of optical isomer crystallized per batch. However, the amount of optical isomer crystallized per batch has a certain limit, because the amount is limited within such a stable range that the supersaturated state of one optical isomer remaining as a solution after the crystallization of the other optical isomer can be sufficiently maintained.

The supersaturation degree optimum for resolution and crystallization of a supersaturated solution prepared from a saturated solution is related with the solubility curve of said saturated solution. For example, in the case of a solution in an aliphatic alcohol such as methanol, the solubility curve of DL-acyl-alanine is steep and therefore the supersaturation degree is about 2–5 g./100 cc. at 30° C., while in the case of a solution in a lower alkylketone, the curve is gentle and therefore the supersaturation degree is about 0.2–1.0 g./100 cc. at 30° C.

In this step, the temperature adopted in preparing a supersaturated solution of DL-acyl-alanine by cooling more or less varies depending on the kind of solvent used, and is ordinarily in the range of about 5° to 40° C. However, the temperature may suitably be selected so that a stable supersaturated state can be attained. Further, the temperature at the time of resolution and crystallization is not particularly limited regardless of whether the preparation is effected according to batch process or continuous process. In practice, however, it is desirable to effect the crystal-separating operation at or below room temperature in view of economy and operational technique for preventing solvent loss due to filtration of crystals. Further, it is a well known fact that the amount of optical isomer crystallized is affected by the size of seed crystals, the stirred state of solution and crystallization time. Even when selective crystallization has been effected under strictly controlled conditions of supersaturation degree and crystallization amount, the resulting crystals are not always optically pure. However, the object of resolution itself can be sufficiently achieved so far as no excessive crystallization has been effected. In practice, it is not objectionable that the resulting crystals are optically impure. Such crystals can be easily made optically pure by washing or recrystallization by use of a solvent in an amount sufficient to dissolve DL-acyl-alanine contained therein.

Then, the third step, i.e. the hydrolysis for deacylation and dealkylation of the thus obtained L-acylalanine is effected according to such ordinary procedures, for example, by a procedure wherein the compound is deacylated by treatment with hydrohalogenic acid in the presence of a phenol or by another procedure wherein the compound is deacylated with a dilute acid or alkali and then dealkylated by treatment with hydrohalogenic acid in the presence of a phenol. That is, the L-N-acyl-alanine is either reacted for several to several ten hours until the hydrolysis has substantially been complete with an aqueous hydrochloric acid solution (18–22% solution) or with an aqueous solution of hydrohalogenic acid such as hydrobromic acid (18–48% solution) which can be saturated when heated under reflux in the presence of a phenol, or is heated under refluxed for several to ten several hours together with a dilute mineral acid such as dilute hydrochloric or sulfuric acid (2–10% solution) or with a dilute alkali such as dilute sodium, potassium or barium hydroxide (2–10% solution). Therefore, the reaction mixture is neutralized with an alkali, such as ammonia water or sodium hydroxide, or with an acid such as hydrochloric or sulfuric acid. Subsequently, the neutralized liquid is treated for several to several ten hours with an aqueous hydrochloric acid solution (18–22% solution) or with an aqueous solution of hydrohalogenic acid such as hydrobromic acid (18–45% solution) which can be saturated when heated under reflux in the presence of a phenol.

The above hydrolysis step should be carried out in the presence of a phenol such as phenol or cresol, since the formation of by-product is inhibited with such phenol, whereby the desired L-methyldopa can be obtained in high yields. The molar ratio of the L-optical isomer to the phenol is usually in the range of not less than 1, and preferably of about 1.5–6.

After completion of the hydrolysis, the L-methyldopa formed is recovered from the reaction mixture according to ordinary procedures. For example, the reaction mixtue is distilled under reduced pressure to remove excess phenol and hydrohalogenic acid; the residual substance is taken up to water and an aliphatic lower alkyl ester such as ethyl acetate or isobutyl acetate; the mixture is stirred to dissolve the residual substance; and then the aqueous layers are separated and recovered. This aqueous layer is neutralized with, for example, a base such as ammonia water or with a lower intramolecular ether such as ethylene oxide, whereby L-methyldopa deposits as a crude product, which is then recrystallized from water to obtain pure L-methyldopa. Further, said DL-alanine is prepared from safrol which is obtainable with ease and at low cost. That is, the DL-alanine is obtained by, for example, isomerizing safrol to isosafrol, oxidizing the isosafrol, reacting the resulting 3,4-methylenedioxyphenylacetone with sodium cyanide and ammonium carbonate to form 5-methyl-5-(3′,4′-methylenedioxybenzyl)-hydantoin, and then hydrolyzing said hydantoin with an alkali.

In the manner as mentioned above, the L-alanine is coverted into the useful L-methyldopa. On the other hand, the D-acyl-alanine can be converted into 3,4-methylenedioxyphenylacetone by deacylating with, for example, a dilute mineral acid, such as dilute hydrochloric or sulfuric acid, or a dilute alkali, and then oxidizing with a hypohydrohalogenic acid, such as hypochlorous or hypobromous acid, or with an alkali metal salt thereof. Finally, therefore, all the DL-acyl-alanine, including D-acyl-alanine, can be converted into L-methyldopa.

As mentioned above, in accordance with the method of the present invention, the L-methyldopa can be prepared by the direct optical resolution according to the advantageous selective crystallization of DL-acyl-alanine derived from DL-alanine. Thus, the present method is markedly excellent process for the commercial production of L-methyldopa.

The method of the present invention will be illustrated in further detail below with reference to examples.

EXAMPLE 1

(a) 22.3 g. of DL-α-methyl-β-(3,4-methylenedioxyphenyl)-alanine was dissolved in 100 ml. of glacial acetic acid and 32 g. of acetic anhydride. The resulting solution was gradually heated with stirring for 5 hours. After completion of the reaction, excess acetic acid was removed by distillation under reduced pressure. The residue was added with 200 ml. of water, thereby to recover 25.7 g. of crude DL-N-acetyl-α-methyl-β-(3,4-methylenedioxyphenyl)-alanine. Recrystallization from aqueous methanol gave pure DL-acetyl alanine, M.P. 160°–161° C. Elementary analysis showed the following:

Calcd. for $C_{13}H_{15}NO_5$ (percent): C, 58.86; H, 5.70; N, 5.28. Found (percent): C, 58.51; H, 5.76; N, 5.20.

(b) 35.3 g. of DL-α-methyl-β-(3,4-methylenedioxyphenyl)-alanine was dissolved in a solution of 7.2 g. of sodium hydroxide in 230 ml. of water. To the resulting solution was added dropwise 30 g. of acetic anhydride while maintaining below 30° C. and at a pH range of pH 10 to 11 by addition of a 20% aqueous sodium hydroxide solution. After completion of the addition, the resulting mixture was stirred for additional 3 hours. After completion of the reaction, 50 ml. of conc. hydrochloric acid was added to the reaction mixture which was then allowed to stand overnight. Crystalline substances thus separated were recovered by filtration, washed with water and then dried to give 38.6 g. of DL-acetyl-alanine.

(c) Following the same procedure as described in the above (b) except that the acetic anhydride was replaced by an equal amount of acetyl chloride, there was obtained 37.6 g. of DL-acetyl-alanine.

EXAMPLE 2

22 g. of DL-N-acetyl-α-methyl-β-(3,4-methylenedioxyphenyl)-alanine (DL-acetyl-alanine) obtained as in Example 1 was dissolved with stirring at 50°–60° C. in 200 ml. of methanol to form a clear solution. After cooling to 27° C., the solution was incorporated with 1 g. of a powder of L-acetyl alanine [$\alpha_D^{22°C.}=-58°$ (c.=0.5 methanol), M.P. 211°–215° C.] and was gently stirred at said temperature for 10 minutes. The deposited crystals were filtered, were washed with cold methanol and were then dried to obtain 1.5 g. in total of crude L-acetyl-alanine, M.P. 210°–215° C., $\alpha_D^{26°C.}=-56.0$- (c.=0.5 methanol). Thus, the amount of L-acetyl-alanine crystallized was 0.5 g.

EXAMPLE 3

20 g. of DL-acetyl-alanine obtained as in Example 1 was dissolved with stirring at 50°–60° C. in 200 ml. of methanol to prepare a clear solution. The solution was gradually cooled with stirring and when the temperature had become 37° C., the solution was seeded with 1 g. of powdered D-acetyl-alanine [$\alpha_D^{22°C.}=+58.0$ (c.=1 methanol), M.P. 211°–215° C.]. The solution was cooled to 25° C. over a period of 30 minutes and was then gently stirred at said temperature for additional 60 minutes to effect sufficient crystallization. The resulting crystals were filtered, were washed with 3 ml. of cold methanol and were then dried to obtain 3.1 g. in total of crude D-acetyl-alanine, M.P. 210°–215° C., $\alpha_D^{26°C.}=+58.0°$ (c.=0.5 methanol), optical purity: 99–100%. Therefore, the amount of the crude D-acetyl-alanine crystallized was 2.1 g. Subsequently, the mother liquor (together with the wash liquid) was incorporated with 2 g. of DL-acetyl-alanine and, after repeating the above procedure, was seeded with 1 g. of L-acetyl-alanine to obtain 2.8 g. of crude L-acetyl-alanine, M.P. 210°–215° C., $\alpha_D^{26°C.}=-56.0°$ (c.=0.5 methanol), crystallized amount 1.8 g., optical purity 97%. Thereafter D- and L-acetyl alanines were alternately crystallized to obtain the results as set forth in the following table:

| No. | Amount of additional DL-acetyl-alanine (g.) | Amount of mother liquor* (g.) | Seeded amount (g.) | Crystallized amount (g.) | $\alpha_D^{26°}$ C. (c.=0.5 methanol) | M.P. (°C.) |
|---|---|---|---|---|---|---|
| 1 | 3.0 | 175 | D 1.0 | 2.4 | +55.0 | 210–215 |
| 2 | 3.0 | 174 | L 1.0 | 2.5 | −54.0 | 209–214 |
| 3 | 3.0 | 176 | D 1.0 | 3.5 | +55.0 | 210–215 |
| 4 | 3.0 | 174 | L 1.0 | 3.5 | −55.0 | 210–215 |
| 5 | 3.0 | 172 | D 1.0 | 3.0 | +55.2 | 210–215 |
| 6 | 3.0 | 173 | L 1.0 | 2.9 | −55.0 | 210–215 |
| 7 | 3.0 | 175 | D 1.0 | 2.8 | +56.0 | 210–215 |
| 8 | 3.0 | 170 | L 1.0 | 2.9 | −56.8 | 210–215 |

*The amount of mother liquor includes the amount of wash liquid.

EXAMPLE 4

Direct optical resolution was effected in the same manner as in Example 3, using 250 ml. of isopropanol in place of methanol and dissolving 10 g. of DL-acetyl-alanine, to obtain the results shown in the following table:

| No. | Amount of additional DL-acetyl-alanine (g.) | Amount of mother liquor (g.) | Seeded amount (g.) | Crystallized amount (g.) | $\alpha_D^{25°}$ C. (c.=0.5 methanol) | M.P. (° C.) |
|---|---|---|---|---|---|---|
| 1 |  | 202 | D 1.0 | 0.8 | +56.0 | 210–215 |
| 2 | 1.0 | 196 | L 1.0 | 1.5 | −56.0 | 210–215 |
| 3 | 1.5 | 203 | D 1.0 | 1.5 | +56.5 | 210–215 |
| 4 | 1.5 | 200 | L 1.0 | 1.4 | −55.0 | 210–215 |
| 5 | 1.5 | 198 | D 1.0 | 1.5 | +56.5 | 210–215 |
| 6 | 1.5 | 196 | L 1.0 | 1.5 | −56.3 | 219–215 |

EXAMPLE 5

6 g. of the L-acetyl-alanine obtained in Example 3 was mixed with 54 g. of 47% hydrobromic acid and 10.8 g. of phenol, and the mixture was refluxed for 3 hours. After completion of the reaction, excess hydrobromic acid and phenol were recovered under reduced pressure. The residue was dissolved in 20 ml. of water and 30 ml. of ethyl acetate, and the aqueous layer was separated and recovered. After decoloration, the aqueous layer was neutralized to pH 5.5 with 10% ammonia water containing a small amount of sodium bisulfite. After allowing the neutralized water layer to stand overnight at below 10° C., deposited crystals were recovered by filtration and were washed with ice water, yield 4.0 g. The product was crude L-methyldopa sesquihydrate and showed $\alpha_D^{20°C.}=-14.0°$ (c.=1 phosphoric acid buffer solution with pH 6.5). The thus obtained hydrate was recrystallized from 10 times the amount of said hydrate of water containing a small amount of sodium bisulfite to obtain pure, L-methyldopa sesquihydrate, $\alpha_D^{20°\,C.}=14.0°$ (c.=1 phosphoric acid buffer with pH 6.5).

EXAMPLE 6

3 g. of L-acetyl-alanine obtained in Example 4 was mixed with 25 ml. of 20% hydrochloric acid and 6 g. of phenol, and the mixture was refluxed for 15 hours. in Example 5 were effected to obtain 2.1 g. of sesquihydrate of crude L-methyldopa, $\alpha_D^{20°\,C.}=-14.1°$ (c.=1 After completion of the reaction, the same operations as phosphoric acid buffer solution with pH 6.5).

EXAMPLE 7

11.15 g. of α-methyl-β-(3,4-methylenedioxyphenyl)-alanine was dissolved in 12.3 g. of acetic anhydride and 46 g. of 99% formic acid. The resulting solution was stirred overnight at room temperature. After completion of the reaction, excess formic acid was removed by distillation under reduced pressure. The residue was added with 100 ml. of water. The crystallized DL-N-formyl-α-methyl-β-(3,4-methylenedioxyphenyl)-alanine was filtered, washed with water and then dried. 10.8 g. of crude DL-formyl alanine was obtained. Recrystallization from aqueous methanol gave pure DL-formyl alanine, M.P. 160°–161° C. Elementary analysis showed the following:

Calcd. for $C_{12}H_{13}NO_5$ (percent): C 57.37, H 5.22, N 5.58. Found (percent): C 57.10, H 5.01, N 6.00.

EXAMPLE 8

20 g. of DL-N-formyl-α-methyl-β-(3,4-methylene-dioxyphenyl)-alanine (DL-formyl alanine) was dissolved with stirring at 50°–70° C. in 200 ml. of ethyl acetate to form a clear solution. After cooling to 30° C., the solution was seeded with 1 g. of a powder of L-formyl alanine $[\alpha_D^{17°\,C.}=+38.0°$ (c.=0.5 in methanol), M.P. 175°–177° C.], and then cooled to 10° C. over 30 minutes. Stirring was continued for additional 60 minutes with keeping at 20° C. The deposited crystals were filtered, were washed with 3 ml. of cold ethyl acetate and were then dried to obtain 2.5 g. in total of crude L-formyl alanine, M.P. 174°–175° C., $\alpha_D^{20°\,C.}=+37.5°$ (c.=0.5 in methanol). Thus the amount of L-formyl alanine crystallized was 1.5 g.

EXAMPLE 9

20 g. of DL-formyl alanine was dissolved with stirring at about 50° C. in 150 ml. of acetone to form a clear solution. After cooling to 30° C., the solution was seeded with 1 g. of a powder of D-formyl alanine $[\alpha_D^{20°\,C.}=-37.1°$ (c.=0.5 in methanol), M.P. 175°–177° C.]. The solution was cooled with gentle stirring over 30 minutes to 10° C. While keeping at 20° C., further stirring was made for 60 minutes. The deposited crystals were filtered, were washed with 3 ml. of cold acetone and dried to obtain 2.3 g. in total of crude D-formyl alanine, M.P. 171°–173° C., $\alpha_D^{20°\,C.}=-37.0°$ (c.=0.5 in methanol). Thus the amount of D-formyl alanine crystallized was 1.3 g.

Into the remaining mother liquor (with washings), DL-formyl alanine was additionally dissolved. The resulting solution was treated in the same manner as above thereby to obtain D- and L-formyl alanines alternately. The results are set forth in the following table.

| No. | Amount of additional DL-formyl-alanine (g.) | Amount of mother liquor (g.) | Type and amount of seeded formyl alanine (g.) | Amount of Crystallized formyl alanine (g.) | $\alpha_D^{26}$ (c.=0.5 in MeOH) | M.P. (° C·) |
|---|---|---|---|---|---|---|
| 1 | 1.5 | 135 | L 1.0 | 1.2 | +37.0 | 171–173 |
| 2 | 2.0 | 140 | D 1.0 | 1.5 | −36.5 | 170–173 |
| 3 | 2.0 | 135 | L 1.0 | 1.8 | +37.0 | 171–173 |
| 4 | 1.8 | 130 | D 1.0 | 1.8 | −37.5 | 174–176 |
| 5 | 2.0 | 135 | L 1.0 | 1.8 | +36.5 | 171–174 |
| 6 | 1.8 | 131 | D 1.0 | 1.7 | −36.5 | 170–173 |

EXAMPLE 10

3 g. of L-formyl alanine obtained in Example 7 was added with 25 ml. of 20% hydrochloric acid and 6 g. of phenol. The resulting mixture was refluxed for 15 hours. After completion of the reaction, the resulted reaction mixture was worked up in the same manner as in Example 4, thereby to obtain 2.2 g. of crude L-methyldopa sesquihydrate, $\alpha_D^{20}=-14.0°$ (c.=1 in a phosphoric acid buffer solution of pH 6.5).

What is claimed is:

1. A process for obtaining substantially pure L-(−)-α-methyl-β-(3,4-dihydroxyphenyl)-alanine which comprises the steps of seeding a saturated solution of DL-N-acyl-α-methyl-β-(3,4-methylenedioxyphenyl)-alanine with L-N-acyl-α-methyl-β-(3,4 - methylenedioxyphenyl)-alanine to initiate crystallization of L-N-acyl-α-methyl-β-(3,4-methylenedioxyphenyl)-alanine from said solution, recovering the crystallized L-N-acyl-α-methyl-β-(3,4-methylenedioxyphenyl)-alanine, and deacylating and dealkylating said recovered crystallized L-N-acyl-α-methyl-β-(3,4-methylenedioxyphenyl)-alanine by hydrolysis in the presence of a phenol to produce said L-(−)-α-methyl-β-(3,4-dihydroxyphenyl)-alanine.

2. The process according to claim 1 wherein said crystallization is conducted in a batchwise manner.

3. The process according to claim 1 wherein said crystallization is conducted in a continuous manner.

4. A process for obtaining substantially pure L-(−)-α-methyl-β-(3,4-dihydroxyphenyl)-alanine which comprises the steps of seeding a saturated solution of DL-N-acetyl-α-methyl-β-(3,4-methylenedioxyphenyl)alanine to initiate crystallization of L-N-acetyl-α-methyl-β-(3,4-methylenedioxyphenyl)-alanine from said solution, recovering the crystallized L-N-acetyl-α-methyl-β-(3,4 - methylenedioxyphenyl)-alanine, and deacylating and dealkylating said recovered crystallized L-N-acetyl-α-methyl-β-(3,4 - methylenedioxyphenyl)-alanine by hydrolysis in the presence of a phenol to produce said L-(−)-α-methyl-β-(3,4-dihydroxyphenyl)-alanine.

5. The process according to claim 2 wherein said crystallization is conducted in a batchwise manner.

6. The process according to claim 2 wherein said crystallization is conducted in a continuous manner.

References Cited

UNITED STATES PATENTS 3,158,648   11/1964   Jones et al. _____ 260—519
3,405,159   10/1968   Krieger et al. _____ 260—519
3,440,279   4/1969   Sugimoto et al. _____ 260—519

LORRAINE A. WEINBERGER, Primary Examiner

L. A. THAXTON, Assistant Examiner

U.S. Cl. X.R.

260—309.7, 340.5